United States Patent [19]
Chang et al.

[11] Patent Number: 6,082,849
[45] Date of Patent: *Jul. 4, 2000

[54] RANDOM PRINTMASKS IN A MULTILEVEL INKJET PRINTER

[75] Inventors: Michael Ming Hsin Chang; Francis Edward Bockman, both of San Diego, Calif.

[73] Assignee: Hewlett-Packard Company, Palo Alto, Calif.

[*] Notice: This patent is subject to a terminal disclaimer.

[21] Appl. No.: 08/814,949

[22] Filed: Mar. 10, 1997

[51] Int. Cl.[7] .................. B41J 2/21; B41J 29/38; B41J 29/393
[52] U.S. Cl. .................. 347/43; 347/14; 347/19
[58] Field of Search .................. 347/43, 14, 15, 347/100, 19; 358/298, 447, 448; 395/117, 109, 134

[56] References Cited

U.S. PATENT DOCUMENTS

| | | | |
|---|---|---|---|
| 4,748,453 | 5/1988 | Lin | 347/41 |
| 4,965,593 | 10/1990 | Hickman | 347/12 |
| 5,294,996 | 3/1994 | Sobue | 358/298 |
| 5,387,976 | 2/1995 | Lesniak | 356/379 |
| 5,416,612 | 5/1995 | Ingraham et al. | 347/15 |
| 5,483,625 | 1/1996 | Robertson et al. | 395/117 |
| 5,519,815 | 5/1996 | Klassen | 395/109 |
| 5,555,006 | 9/1996 | Cleveland | 347/41 |
| 5,561,449 | 10/1996 | Raskin | 347/37 |
| 5,563,985 | 10/1996 | Klassen et al. | 395/109 |
| 5,642,474 | 6/1997 | Parkhurst et al. | 395/117 |
| 5,729,259 | 3/1998 | Gotoh et al. | 347/43 |
| 5,848,225 | 12/1998 | Nickell et al. | 395/109 |

FOREIGN PATENT DOCUMENTS

| | | | |
|---|---|---|---|
| 0632405A2 | 1/1995 | European Pat. Off. | G06K 15/10 |
| 0738068A2 | 10/1996 | European Pat. Off. | H04N 1/034 |
| 738068 | 10/1996 | European Pat. Off. | |
| 074584A1 | 12/1996 | European Pat. Off. | B41J 2/21 |
| 58-081381 | 5/1983 | Japan | H04N 1/40 |
| 01163071 | 6/1989 | Japan | B41J 3/04 |

Primary Examiner—N. Le
Assistant Examiner—Thinh Nguyen
Attorney, Agent, or Firm—Jerry R. Potts

[57] ABSTRACT

One form of the printer inks multiple tonal levels, as for continuous-tone images. A generally randomized printmask controls the printer. What is randomized is, for each pixel respectively, an indicator of whether to print or not. Each indicator is, preferably, a discriminator number for comparison with desired-image data—specifically with a desired tonal level, at each pixel, for the desired color image—to make each printing decision. Preferably the printer is thereby deciding whether to deposit a certain number of drops per pixel; it compares the discriminator with a particular number of desired drops, for the desired image. The discriminator at each pixel is in general different for multiple passes and these discriminators for the passes form a sequence. The sequence, for each pixel., is preferably selected at random from a multiplicity of sequences. Preferably the sequence for each pixel is preselected at random; and the selected sequences for all pixels are prestored in nonvolatile memory. To do this, preferably each sequence is numbered and the sequence for each pixel is selected by randomly selecting a sequence number. Another preferred form of the printer is not necessarily multilevel but the sequences are selected as just described. A method is included for initial construction, and storage on a tangible medium, of the sequences—and later recall and use.

22 Claims, 8 Drawing Sheets

| | | | | | |
|---|---|---|---|---|---|
| 11 | | | | | |
| 41 | | | | | |
| 11 | 00 | | | | |
| 00 | 02 | | | | |
| 23 | 00 | 11 | | | |
| 01 | 12 | 20 | | | |
| 30 | 23 | 02 | 14 | | |
| 10 | 03 | 01 | 34 | | |
| 00 | 44 | 12 | 30 | 23 | |
| 40 | 00 | 33 | 01 | 24 | |
| 21 | 40 | 14 | 03 | 02 | 30 |
| 33 | 00 | 04 | 22 | 41 | 10 |
| | 42 | 00 | 23 | 30 | 04 |
| | 02 | 24 | 10 | 00 | 33 |
| | | 23 | 34 | 02 | 40 |
| | | 31 | 23 | 44 | 10 |
| | | | 34 | 00 | 42 |
| | | | 40 | 03 | 34 |
| | | | | 00 | 41 |
| | | | | | 01 |

FIG. 12

| | # Cyan Dark c: 1 | # Magenta Dark C: 1 | #Yellow Y: 1 | #Cyan Light m: 1 | #Magenta Light M: 1 | #Black y: 1 |
|---|---|---|---|---|---|---|
| | 00000000 00000000 | 00000000 00000000 | 0000000 0000000 | 00000000 00000000 | 00000000 00000000 | 00000000 00000000 |
| A | 14230142 02304023 20143201 31020310 04102014 40213402 02034020 23401234 01340013 40201402 | 42300423 23041230 01430014 10204102 41023410 02130021 20341203 34010340 13402134 02013020 | 23001230 30410304 14302143 02043020 10230102 21304213 03410034 40102401 34020340 20134201 | 30014300 04102041 43020430 20431024 02304023 13040130 34102341 01023010 40201402 01340013 | 00142001 41023410 30201302 04310043 23041230 30402304 41020410 10234102 02013020 13402134 | 01423014 10230102 02014020 43102431 30410304 04021040 10203102 02340023 20134201 34020340 |
| B | 42300423 23041230 01430014 10204102 41023410 02130021 20341203 34010340 13402134 02013020 | 23001230 30410304 14302143 02043020 10230102 21304213 03410034 40102401 34020340 20134201 | 30014300 04102041 43020430 20431024 02304023 13040130 34102341 01023010 40201402 01340013 | 00142001 41023410 30201302 04310043 23041230 30402304 41020410 10234102 02013020 13402134 | 01423014 10230102 02014020 43102431 30410304 04021040 10203102 02340023 20134201 34020340 | 14230142 02304023 20143201 31020310 04102014 40213402 02034020 23401234 01340013 40201402 |
| C | 23001230 30410304 14302143 02043020 10230102 21304213 03410034 40102401 34020340 20134201 | 30014300 04102041 43020430 20431024 02304023 13040130 34102341 01023010 40201402 01340013 | 00142001 41023410 30201302 04310043 23041230 30402304 41020410 10234102 02013020 13402134 | 01423014 10230102 02014020 43102431 30410304 04021040 10203102 02340023 20134201 34020340 | 14230142 02304023 20143201 31020310 04102014 40213402 02034020 23401234 01340013 40201402 | 42300423 23041230 01430014 10204102 41023410 02130021 20341203 34010340 13402134 02013020 |
| D | 30014300 04102041 43020430 20431024 02304023 13040130 34102341 01023010 40201402 01340013 | 00142001 41023410 30201302 04310043 23041230 30402304 41020410 10234102 02013020 13402134 | 01423014 10230102 02014020 43102431 30410304 04021040 10203102 02340023 20134201 34020340 | 14230142 02304023 20143201 31020310 04102014 40213402 02034020 23401234 01340013 40201402 | 42300423 23041230 01430014 10204102 41023410 02130021 20341203 34010340 13402134 02013020 | 23001230 30410304 14302143 02043020 10230102 21304213 03410034 40102401 34020340 20134201 |
| E | 00142001 41023410 30201302 04310043 23041230 30402304 41020410 10234102 02013020 13402134 | 01423014 10230102 02014020 43102431 30410304 04021040 10203102 02340023 20134201 34020340 | 14230142 02304023 20143201 31020310 04102014 40213402 02034020 23401234 01340013 40201402 | 42300423 23041230 01430014 10204102 41023410 02130021 20341203 34010340 13402134 02013020 | 23001230 30410304 14302143 02043020 10230102 21304213 03410034 40102401 34020340 20134201 | 30014300 04102041 43020430 20431024 02304023 13040130 34102341 01023010 40201402 01340013 |
| F | 01423014 10230102 02014020 43102431 30410304 04021040 10203102 02340023 20134201 34020340 | 14230142 02304023 20143201 31020310 04102014 40213402 02034020 23401234 01340013 40201402 | 42300423 23041230 01430014 10204102 41023410 02130021 20341203 34010340 13402134 02013020 | 23001230 30410304 14302143 02043020 10230102 21304213 03410034 40102401 34020340 20134201 | 30014300 04102041 43020430 20431024 02304023 13040130 34102341 01023010 40201402 01340013 | 00142001 41023410 30201302 04310043 23041230 30402304 41020410 10234102 02013020 13402134 |
| | 00000000 00000000 | 00000000 00000000 | 00000000 00000000 | 00000000 00000000 | 00000000 00000000 | 00000000 00000000 |

FIG. 14

| # Yellow | #Magenta Light | #Cyan Light | #Magenta Dark | #Cyan Dark | #Black |
|---|---|---|---|---|---|
| Y: 1 | M: 1 | m: 1 | C: 1 | c: 1 | y: 1 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 13421342 | 41234123 | 24312431 | 41234123 | 32143214 | 13421342 |
| 42134213 | 23412341 | 31243124 | 23412341 | 14321432 | 42134213 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 41234123 | 24312431 | 32143214 | 23412341 | 13421342 | 41234123 |
| 23412341 | 31243124 | 14321432 | 31243124 | 42134213 | 23412341 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 23412341 | 32143214 | 13421342 | 32143214 | 41234123 | 24312431 |
| 31243124 | 14321432 | 42134213 | 14321432 | 23412341 | 31243124 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |
| 32143214 | 13421342 | 41234123 | 13421342 | 24312431 | 32143214 |
| 14321432 | 42134213 | 23412341 | 42134213 | 31243124 | 14321432 |

RANDOM PRINTMASKS IN A MULTILEVEL INKJET PRINTER

RELATED PATENT DOCUMENTS

Related documents include a coowned U.S. utility-Pat. No. 5,561,449, entitled "POSITION LEADING, DELAY, & TIMING UNCERTAINTY TO IMPROVE POSITION & QUALITY IN BIDIRECTIONAL INKJET PRINTING"; as well as U.S. patent application Ser. No. 08/667,532, entitled "JITTER-FORM BACKGROUND CONTROL FOR MINIMIZING SPURIOUS GRAY CAST IN SCANNED IMAGES" and now issued as U.S. Pat. No. 5,859,928, and in the name of Josep Maria Serra, entitled "MULTIPASS INKJET PRINT-MODES WITH RANDOMIZED DOT PLACEMENT, TO MINIMIZE PATTERNING AND LIQUID LOADING" as U.S. Pat. No. 6,019,454 on Feb. 1, 2000. Another such document is in the names of Hickman, and issued as U.S. Pat. No. 4,965,593 on Oct. 23, 1990. A third related document is in the names of Cleveland, issued as U.S. Pat. No. 5,555,006 on Sep. 10, 1996. All these documents in their entireties are hereby incorporated herein by reference.

FIELD OF THE INVENTION

This invention relates generally to machines and procedures for printing images—including color text or graphics as well as continuous-tone (e. g., photograph-like) images—on printing media such as paper, transparency stock, or other glossy media; and more particularly to a scanning inkjet machine and method that construct text or images from individual ink spots created on a printing medium, in a two-dimensional pixel array. Although currently preferred embodiments of the invention are used to optimize multilevel printing—which is aimed at providing fine, photograph-like image quality—the invention itself can be used as well to improve printing quality in binary printers.

BACKGROUND OF THE INVENTION

In the current generation of computer-controlled printing machines, interest is focused on several difficult problems.

(a) Throughput and cost—In a sense many problems flow from these two considerations, since essentially all the problems would evaporate if it did not matter how slow or expensive a printer was. In practice, marketplace pressures have made it crucially important that a printer be both competitively fast (even when printing in a "quality" mode) and competitively economical.

(b) Banding and pattern artifacts—These spurious image elements are well known in lower-performance printers, but like other problems can remain troublesome, or in some cases be even more difficult to resolve, in the newer generation of devices. It is known, for example, that some banding effects can be reduced by printing highly staggered (i. e., overlapping) swaths—but also that doing so reduces overall throughput proportionately. Hence, again, high throughput tends to run counter to elimination of banding, and this conflict is aggravated by a requirement for printing at photo-like quality.

As to pattern defects, the design of dither arrays or error diffusion is a logical culprit and has previously received a great deal of attention in this regard, and may be considered highly refined. Patterning originating in dither and error diffusion tends to be severe in part because a binary four-color system is capable of rendering directly such a tiny fraction of the number of colors in an eight-bit, three-primary input—i. e., only $2^4/2^{24}=2^{-20}$ or roughly one millionth.

To mitigate this inherent lack of tonal fidelity, dithering or error-diffusion techniques in effect trade off resolution for dynamic range. In the process these procedures intrinsically give up a very substantial amount of resolution, in the form of spatial perturbation of the original image data.

The spatial extent of such perturbations is an invitation to patterning problems. It may be somewhat less severe in multilevel than binary systems, since a system having for example five levels per color plane and six planes is capable of rendering a much greater fraction of the number of colors in an eight-bit, three-primary input than a binary four-color system. (Such a system is not considered to be prior art, but rather is associated with the development of preferred embodiments of the present invention.)

When two of the color planes are in the form of dual dilutions of a single colorant, the number of actually distinct tones is not—calorimetrically—as large as simple arithmetic might suggest. Still, such arithmetic may be helpful for purposes of general orientation, and it indicates that the directly renderable fraction of input colors is raised from a millionth (for a binary system) to $5^6/2^{24}$ or roughly one thousandth.

Yet even this fraction is small and requires some spatial dithering, or for continuous-tone input images preferably error diffusion, and heretofore some patterning persists even in images printed under conditions which should yield the best possible image quality. Theory suggests that such patterning cannot be eliminated through dither or error-diffusion redesign exclusively, and that further improvement must be sought elsewhere.

Generally speaking, tools for investigating this area heretofore have been inadequate.

(c) Liquid loading—Excessive inking is a familiar problem. To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption)—and this drying step can be unduly time consuming.

In addition, if a large amount of ink is put down all at substantially the same time, within each section of an image, related adverse bulk-colorant effects arise. These can include so-called "bleed" of one color into another (particularly noticeable at color boundaries that should be sharp), and "blocking" or offset of colorant in one printed image onto the back of an adjacent sheet with consequent sticking of the two sheets together (or of one sheet to pieces of the apparatus or to slipcovers used to protect the imaged sheet).

Still another effect is "cockle" or puckering of the printing medium. Various techniques are known for use together to moderate these adverse drying-time effects and bulk- or gross-colorant effects.

(d) Prior print-mode techniques—One useful and well-known technique is laying down in each pass of the pen only a fraction of the total ink required in each section of the image—so that any areas left white in each pass are filled in by one or more later passes. This tends to control bleed, blocking and cockle by reducing the amount of liquid that is all on the page at any given time, and also may facilitate shortening of drying time.

The specific partial-inking pattern employed in each pass, and the way in which these different patterns add up to a single fully inked image, is known as a "printmode". Heretofore artisans in this field have progressively devised ways to further and further separate the inking in each pass.

Larry W. Lin, in U.S. Pat. No. 4,748,453 assigned to Xerox Corporation—taught use of a simple checkerboard pattern, which for its time was revolutionary in dividing inking for a single image region into two distinct complementary batches. Lin's system, however, maintains contact between pixels that are neighbors along diagonals and so fails to deal fully with the coalescence problem.

The above-mentioned U.S. Pat. No. 4,965,593, which is in the name of Mark S. Hickman, teaches printing with inkdrops that are separated in every direction—in each printing pass—by at least one blank pixel. The Hickman technique, however, accomplishes this by using a nozzle spacing and firing frequency that are multiples of the pixel-grid spacing in the vertical and horizontal directions (i e., the medium-advance and scan axes respectively).

Accordingly Hickman's system is not capable of printing at on intervening lines, or in intervening columns, between the spaced-apart inkdrops of his system. This limitation significantly hinders overall throughput, since the opportunity to print such further intervening information in each pass is lost.

Moreover the Hickman system is less versatile. It forfeits the ability to print in the intervening lines and columns even with respect to printmodes in which overinking or coalescence problems are absent—such as, for example, a high-quality single-pass mode for printing black and white text.

The above-mentioned U.S. Pat. No. 5,555,006, which is in the name of Lance Cleveland, teaches forming a printmask as plural diagonal lines that are well separated from one another. Cleveland introduces printmodes that employ plural such masks, so that (unlike Hickman) he is able to fill in between printed elements in a complementary way.

It is certainly not intended to call into question the Cleveland teaching, which represents a very substantial advance in the art—over both Lin and Hickman. Cleveland's invention, however, in part is aimed at a different set of problems and therefore naturally has only limited impact on general overinking problem discussed here. In particular Cleveland seeks to minimize the conspicuousness of heater-induced deformation at the end of a page.

Thus even Cleveland's system maintains the drawback of inkdrop coalescence along diagonals and sometimes since he calls for very steeply angled diagonal lines which in some segments are formed by adjacent vertical pixels—even along columns.

Another ironic development along these lines is that the attempts to solve liquid-loading problems through printmask tactics in some cases contribute to pattern artifacts. It will be noted that all the printmodes discussed above—those of Lin, Hickman, Cleveland, and other workers not mentioned—are all highly systematic and thus repetitive.

For example, some printmodes such as square or rectangular checkerboard-like patterns tend to create objectionable moiré effects when frequencies or harmonics generated within the patterns are close to the frequencies or harmonics of interacting subsystems. Such interfering frequencies may arise in dithering subsystems sometimes used to help control the paper advance or the pen speed.

(e) Known technology of printmodes—One particularly simple way to divide up a desired amount of ink into more than one pen pass is the checkerboard pattern already mentioned: every other pixel location is printed on one pass, and then the blanks are filled in on the next pass.

To avoid horizontal "banding" problems (and sometimes minimize the moiré patterns) discussed above, a printmode may be constructed so that the printing medium is advanced between each initial-swath scan of the pen and the corresponding fill-swath scan or scans. This can be done in such a way that each pen scan functions in part as an initial-swath scan (for one portion of the printing medium) and in part as a fill-swath scan.

This technique tends to distribute rather than accumulate print-mechanism error which is impossible or expensive to reduce. The result is to minimize the conspicuousness of—or, in simpler terms, to hide—the error at minimal cost.

The pattern used in printing each nozzle section is known as the "printmode mask" or "printmask", or sometimes just "mask". The term "printmode" is more general, usually encompassing a description of a mask—or several masks, used in a repeated sequence or so-called "rotation"—and the number of passes required to reach full density, and also the number of drops per pixel defining what is meant by "full density", and still further a specification of the resulting overall performance in terms such as "best quality" or "fast", or intermediately "normal".

Operating parameters can be selected in such a way that, in effect, mask rotation occurs even though the pen pattern is consistent over the whole pen array and is never changed between passes. Figuratively speaking this can be regarded as "automatic" rotation or simply "autorotation".

As mentioned above, some of these techniques do help to control the objectionable patterning that arises from the periodic character of printmasks employed heretofore. Nevertheless, for the current new generation of color printers (including high-resolution printers, or multilevel printers) generally speaking the standards of printing quality are higher, and a more-advanced control of this problem is called for.

(f) Conclusion—Thus persistent problems of liquid loading, and pattern artifacts, countermeasured against pervasive concerns of throughput and cost, have continued to impede achievement of uniformly excellent inkjet printing. It may be added that certain combinations of these difficulties are more readily controlled on one and another printing medium; however, at least some of these problems remain significant with respect to all industrially important printing media.

Thus, as can be seen, important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a multilevel printer for printing a color image on a printing medium. This printing is performed by construction from individual inkdrops formed in a pixel array.

The apparatus includes some means for forming inkdrops on such a medium. For purposes of generality and breadth in describing and discussing the invention, these means will be called the "forming means".

The forming means include means for inking multiple tonal levels, as desired for a particular desired color image, for at least one colorant. Once again for breadth and generality we shall call these mean the "inking means".

The apparatus also has some means for establishing a generally randomized printmask. We shall refer to these as the "establishing means".

By the term "establishing" we do not mean to be limited to equipment that initially creates such a mask, although of course such equipment is within the scope of the phrase "establishing means"; rather the phrase is to be construed as encompassing equipment that simply holds and provides the information for producing the effect of the randomized mask. Thus, purely by way of example, the establishing means may be cooperating memory and program portions of the central microprocessor unit for a printer—or, if preferred, portions of a separate read-only memory in cooperation with that processor.

By the term "randomized" we do not mean to be limited to equipment that establishes a mask which is truly random—although, once again, such equipment is within the scope of the word "randomized". Indeed, as explained in considerable detail by later sections of this document, such a mask might compromise other key objectives of the invention, particularly including minimization of the patterning or liquid-overload effects of coalescence.

Thus the phrase "randomized printmask" as will be seen is intended to convey a mask generated with at least major random contributions—but also possibly satisfying certain constraints that disrupt the degree of perfection of the randomness. Another way to say the same thing may be "pseuctorandom printmask".

In addition the apparatus includes some means for applying the generally randomized printmask to control the inkjet printing means.

The foregoing may constitute a description or definition of the first facet of the invention in its broadest or most general form. Even in this general form, however, it can be seen that this aspect of the invention significantly mitigates difficulties left unresolved in the art.

In particular, in part through use of a randomized mask the invention tends to avoid the systematic or patterned quality of prior-art masks. The result is to reduce the appearance of patterning artifacts in a printed image—and in particular the provision of this feature in a multilevel printer enables the printer to produce a finished image that is virtually indistinguishable from an original photograph.

Still more astonishingly, when viewing such a printed image and—side-by-side—the original photo that was scanned to prepare the image data for the printing process, it is virtually impossible to determine which is the printed copy and which is the original. In both of the preceding statements we say "virtually" because some highly trained and highly observant professionals are able to tell which is which, and in unusual cases can also sometimes determine whether an individually viewed image is a printed copy or an original photo; however, these are exceptional observers and cases.

Although the invention as thus couched in its broadest form significantly advances the art of high-quality (e. g., high-resolution or photo-like quality) color inkdrop printing, nevertheless the invention is preferably practiced in conjunction with several additional features or characteristics that maximize the enjoyment of its benefits.

For instance preferably the establishing means include some means for establishing an elemental pixel subgrid having plural rows and columns, for use in determining inking patterns substantially throughout the pixel grid. In this case it is also desirable that the establishing means include some means for defining, for each pixel in the subgrid, a generally randomized indicator of whether to print or not.

We also prefer that the defining means in turn include some means for defining as said indicator a discriminator number for comparison with desired-image data. Here it is further preferable that the applying means include means for comparing the discriminator number with a particular desired one of the multiple tonal levels, for the particular desired color image. In particular it is preferred that the inking means include means for depositing or not depositing a number of drops per pixel as desired, for a particular desired color image—and also that the applying means include some means for comparing the discriminator number with a particular number of drops per pixel desired, for the particular desired color image.

In addition we prefer that the forming means include some means for inking, in at least partially overlapping multiple passes, over each subswath of such image on the printing medium; and that the discriminator number at each pixel be in general different for each of the multiple passes, for a particular subswath. For this situation it is also preferred that the discriminator numbers for the multiple passes, at-each pixel, form a sequence of discriminator numbers for that pixel; and that the sequence, for each pixel, is selected substantially at random from a multiplicity of such sequences.

To effect this selection, the sequence for each pixel may be chosen automatically in real time, using a random-number generator that is part of the printer or part of an associated general-purpose computer—or a printer driver operating in such a computer. Preferably, however, the sequence for each pixel is preselected substantially at random from the multiplicity of sequences; and sequences for all pixels are prestored in nonvolatile memory for use in the apparatus. Thus, merely by way of example, the preselection may be performed at the factory, and the sequences all stored in read-only memory or embodied in an application-specific integrated circuit etc. before the product is distributed to a user.

A preferred way of performing the selection, whether in real time or as a preselection, is that each sequence in the multiplicity of sequences be numbered—either arbitrarily or according to some systematic designation, as preferred—and that the respective sequence for each pixel is selected by substantially randomly selecting a sequence number.

Although the foregoing discussion of preferences is couched in terms of an "indicator" that is a discriminator number, as will be understood the sequence technique just described can be used with essentially any other type of indicator—as for example a do-print/don't-print decision indicator in a binary system.

Additionally it is preferred that the mask-establishing means include some means for storing in the pixel subgrid a previously generated, generally random selection of pixel columns for printing of at least one inkdrop, in each pixel row of the elemental pixel subgrid. Also in this case preferably the generally random selection is subject to human intervention for testing and esthetic evaluation of each complete subgrid (printmask).

Actual printmask implementation of the first main aspect of the invention is shown and discussed in the later "DETAILED DESCRIPTION" section of this document.

In preferred embodiments of a second of its aspects, the invention is apparatus for printing a color image on a printing medium, by construction from individual inkdrops formed in a pixel grid of multiple rows and columns. The apparatus includes inkjet printing means for forming inkdrops on such medium in a pixel grid, during plural passes of the printing means over such medium.

The apparatus also includes—for each of the plural passes, some means defining an indicator of whether to print or not at each pixel. It is to be understood that the respective indicators for the plural passes form a sequence of indicators for each pixel.

This sequence, for each pixel, is selected generally at random from a multiplicity of such sequences. The apparatus also includes some means for applying the sequence of indicators to control the inkjet printing means.

The foregoing may represent a definition or description of the second aspect of the invention in its most general or broad form. Even in this form it can be seen that this aspect of the invention too significantly mitigate a difficulty left unresolved in the art.

In particular this aspect of the invention provides an extremely efficient and elegant way of both selecting and designating randomized printmask data. In fact, this form of identifying printmask data is also highly efficient and elegant for selecting and designating printmask data in general—whether or not randomized.

Nevertheless preferably the invention is practiced in conjunction with certain further characteristics or features that additionally enhance enjoyment of its benefits. For example preferably the sequence for each pixel is preselected substantially at random from the multiplicity of sequences; and these preselected sequences—for all pixels—are prestored in nonvolatile memory for use in the apparatus.

We also prefer, as with the first aspect of the invention, that each sequence in said multiplicity of sequences be numbered; and that the sequence for each pixel be selected by substantially randomly selecting a sequence number. Other preferences applicable here also include those mentioned earlier as to the first main facet or aspect of the invention.

In preferred embodiments of yet a third of its basic aspects or facets, the invention is a method for creating and using a printmask for improved print quality in an inkjet printer. The method includes the step of generating a series of substantially random numbers for use in controlling whether printing will occur at a particular pixel in each of successive passes of a printhead.

Another step, for each pixel in the grid, is accumulating the random numbers as a sequence of indicator numbers for controlling printing in successive passes of a printhead. In addition the method includes the step, again for each pixel, of storing the sequence in a tangible medium—for later recall and use in controlling a printer.

The foregoing may constitute a description or definition of the invention in the third of its main aspects or facets. This method has benefits closely related to those of the first two facets already discussed, inasmuch as the method produces printmasks that can be used in the apparatus of those earlier facets of the invention.

Nevertheless this third aspect of the invention is preferably practiced in conjunction with additional characteristics or steps to optimize enjoyment of its advantages. For example preferably the method includes a further step of human testing of each mask by using it to print a variety of challenging images—and then selecting for commercial use those masks which are seen to optimize the esthetic results of the overall printing process for, respectively, a reasonably wide variety of image types, quality requirements and printing parameters.

Preferably in such testing numerous sets of sequences for all pixels are generated and accumulated, and then each set is tested by using it to print test images and then subjecting the test images to esthetic evaluation by humans. We prefer to discard any set of preselected sequences for all pixels that is not judged esthetically acceptable.

As the indicator number for each pixel, we prefer to use a discriminator for comparison with a tonal gradation, or with a quantity of inking, desired at that pixel.

Another preferable step is recalling and using the stored pattern from the tangible medium, for use in the controlling of a printer.

All the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. MULTILEVEL COLOR PRINTING

A preferred embodiment of the present invention is a high-resolution multilevel color printer which includes a main case 1 (FIG. 1) with controls 2, an upwardly hinged front cover 3, and a tray 4 for holding and advancing sheets of new printing medium 4A, on which images are to be printed. Unlike earlier printers generally, this unit accommodates thick, glossy printing medium which is similar in general appearance and texture to the conventional photosensitive paper on which photographic prints are made.

Ordinarily, however, as this medium is for inkjet printing it is not, or at any event need not be, photosensitive. Because the medium is too thick to travel around a cylindrical platen of modest diameter, the printing medium in this printer always advances in just one direction, while remaining flat.

Figures 3, 4, 5, 6:
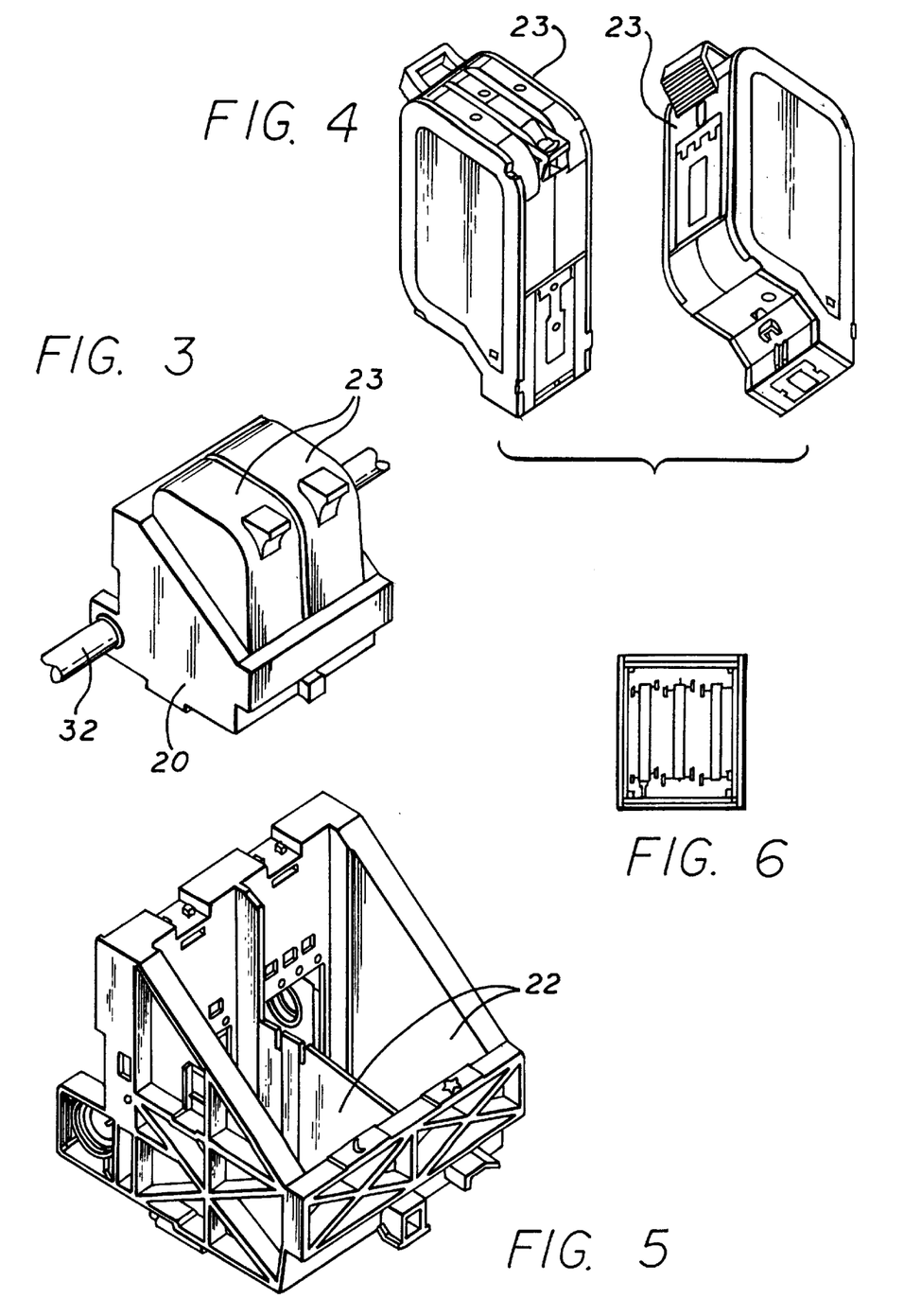
FIG. 3 is a view, like FIG. 1 but very schematic, of a carriage and carriage-drive mechanism which is mounted within the case or cover of the FIG. 1 device.
FIG. 4 is a pair of like views of an integrated triple-printhead pen body, two of which are mounted within the case or cover of the FIG. 1 device, in association with the carriage.
FIG. 5 is a like but more-detailed view of the FIG. 3 carriage, showing bays for the two triple-colorant pen bodies or printhead means which it carries.
FIG. 6 is a bottom plan of one of the pen bodies, showing its three nozzle arrays.

Within the case 1 the carriage assembly with pen bodies 20 (FIGS. 2 through 4) is driven in reciprocation by a motor 31—along a support and guide rail 32 through the intermediary of a drive belt 35. The motor 31 is under control of signals 31A from an electronic system 15, which includes a digital electronic microprocessor, read-only memory and application-specific integrated circuit.

Signals most typically originate in or are acquired by a personal computer or "PC" (at left in FIG. 2), and are twenty-four-bit red, green and blue additive-primary data 22. These signals are subjected to color correction 23 and compression 24, in driver software 25 running in the PC.

Figures 1, 2:
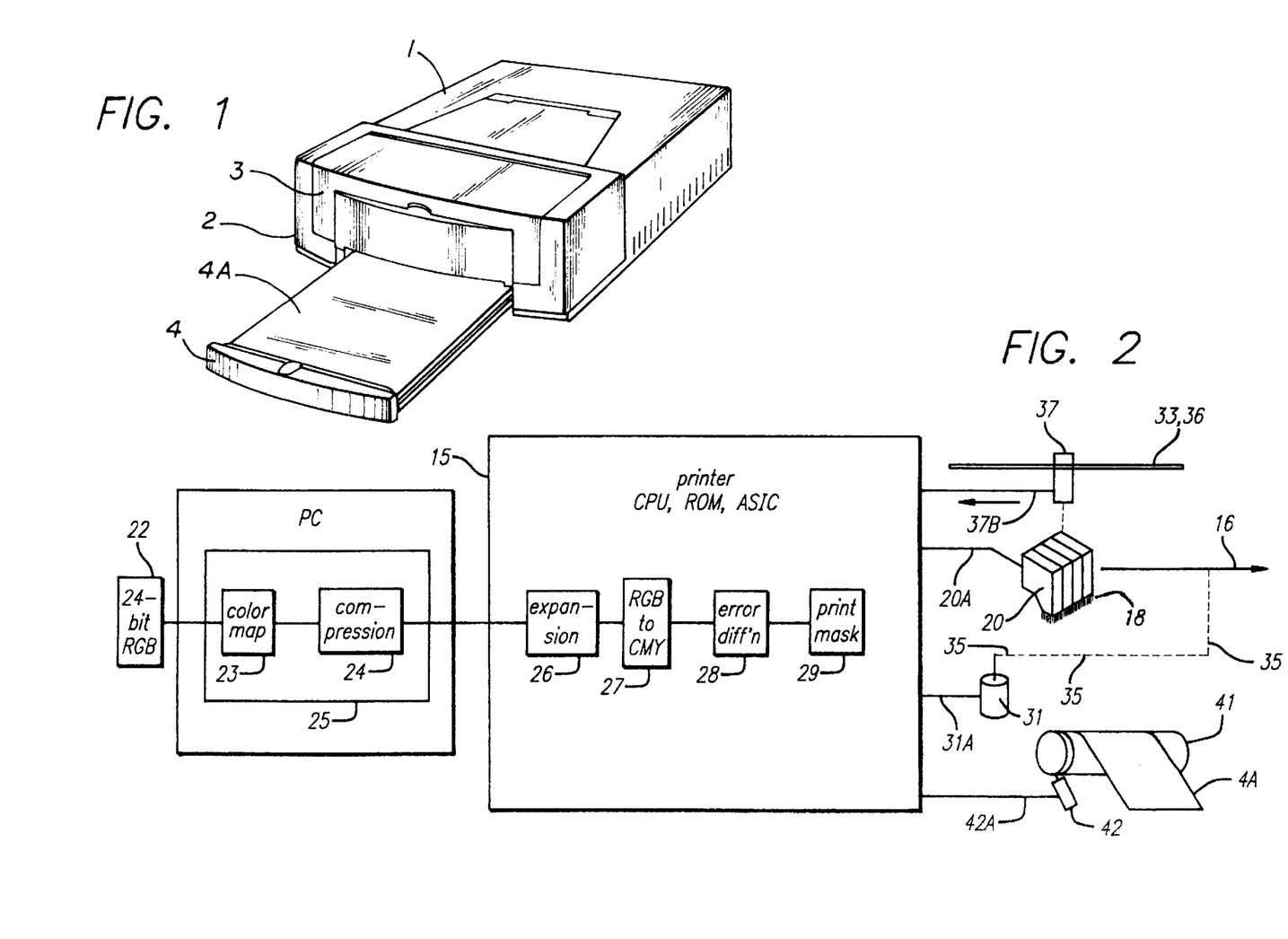
FIG. 1 is an isometric or perspective exterior view of a printer which is a preferred embodiment of the present invention.
FIG. 2 is a highly schematic block diagram of the same product, particularly showing key signals flowing from and to a digital electronic central microprocessor, to effectuate printing.

Compressed data are received by the printer electronics 15, which first reexpand 26 it to recover the full data set and then convert 27 it to, typically, a subtractive-primary system for printing. Although the diagram uses the shorthand designation "CMY" it will be understood that actually the data will be set up for printing in the six-color-plane $C_1C_2M_1M_2YK$ system described in subsection (b) of the "BACKGROUND" section of this document.

For reproduction of photograph-like images, the "CMY" data next proceed to an error-diffusion stage 28, for reduction of the previously mentioned 16½ million possible input colors to numbers within the dynamic range of the system.. This, as previously suggested and as will shortly be shown in more detail, is something less than $5^6$ or some sixteen thousand.

The error-diffused data finally reach a printmask stage 29, which is a primary focus of the present invention. This stage 29 controls 20A nozzles (FIG. 6) in the printheads 20, to eject inkdrops 18 that form the image on the medium 4A. This operation is concurrent with scanning 16 of the printheads 20 across the medium, and with intermittent advance of the medium 4A as shown very schematically at 41. (This showing is particularly schematic in that the printing medium 4A actually does not wrap around a platen 41 as the diagram may seem to suggest.)

A very finely graduated encoder strip 33 (FIG. 2) is extended taut along the scanning path of the carriage assembly 20 and read by an automatic optoelectronic sensor 37 to provide position and speed information 37B for the microprocessor in the printer electronics block 15. (In the block diagram all illustrated signals are flowing from left to right except the information 37B fed back from the sensor—as indicated by the associated leftward arrow.)

The codestrip 33 thus enables formation of color inkdrops at high precision (typically 12 pixels/mm, or 300 dots per inch) during scanning of the carriage assembly 20. Scanning is ordinarily from left to right 16, though the system is capable of use in association with operation in the opposite direction, or in both directions.

A preferred location for the encoder strip 33 is immediately behind the pens. The sensor 37 is disposed with its optical beam passing through transparent portions of a scale formed in the strip.

An advance mechanism (shown only very schematically as a platen 41)—driven by a motor 42 under control of signals 42A from the processor 15—operates under the carriage-assembly 20 scan track to drive sheets of printing medium 4A in a medium-advance direction perpendicular to the scanning. Print medium 4A is thereby moved under the pens on the carriage assembly 20 to receive inkdrops 18 for formation of a desired image. The carriage assembly 20 includes bays 22 (FIG. 5) for preferably two three-chamber pens 23 each holding ink of three different respective colorants—for a total of six distinct colorants, though not six different hues. Ideally in now-preferred multilevel-printer embodiments of the invention, the chambers hold yellow in one chamber of the triple pens 23, two different dilutions of cyan, (which we call "cyan dark" and "cyan light") in two other pen chambers, two different dilutions of magenta, ("magenta dark" and "magenta light") in two still other chambers of the triple pens 23, and black in a sixth chamber.

Our preferred printing system enables printing of any number of drops from zero to four, inclusive—a total of five possible levels—from any of these six nozzle sets. Operationally we treat inking from each of the six chambers as a separate "color plane".

As will be understood, this arrangement numerically provides an overall number of available inking combinations equal to (number of levels)$^{(number\ of\ chambers)} = 5^6$ or roughly sixteen thousand. Since some of these combinations—particularly with respect to the high end of one dilution of a particular primary colorant and the low end of another dilution of the same colorant—in principle may perceptually overlap in some circumstances, the actual number can be lower calorimetrically.

2. RANDOMIZED MASKS (a) General discussion—A printmask is a numerical pattern that determines exactly where inkdrops can be printed in a given pass or, to put the same thing in another way, which passes are permissibly used to print each pixel. In a printmode of a certain number of passes, each pass should print—of all the inkdrops to be printed—a fraction equal roughly to the reciprocal of that number.

As a practical matter, however, printmasks are designed to deal with the pixels to be addressed, rather than "printed". The difference resides in the details of an individual image, which determine whether each particular pixel will be printed in one or another color, or left blank.

Thus a printmask is used to determine in which pass each pixel will be addressed, and the image as processed through various other rendition steps will determine whether each addressed pixel is actually printed, and if so with what color or colors. The printmask is used to, so to speak, "mix up" the nozzles used, as between passes, in such a way as to reduce undesirable visible printing artifacts discussed earlier—banding, etc.

Whereas prior attention has focused upon dither masks as the sources of patterning and other artifacts, the present invention attempts to isolate the contributions of printmasks to these problems—and to their solutions. In particular this invention pursues the elaboration of randomization as a paradigm in printmasks.

This pursuit is totally contrary to all the wisdom of the art heretofore, which has been uniformly devoted to printmask modules and design techniques that are entirely systematic and repetitive—precisely the opposite of random. Through this present contrarian approach a surprisingly high degree of success has been obtained.

(b) Software design tool used in implementing the present invention—The basic strategy for creating print masks involves use of a simple algorithm implemented as a software design tool, operating in an ordinary general-purpose computer—with the results subject to esthetic evaluation by humans who examine actual printouts of difficult images, using esthetic criteria such as contrast within highlights and deep shadows, full tonal range etc.

In practice the invention requires a step of selecting random numbers, which preferably is performed before the printer leaves the factory and whose results are embedded in lookup arrays stored in nonvolatile memory in the printer. The selection process itself is very simple and so can be stated at this early point in the detailed presentation.

Once started 201 (FIG. 7), the process consists primarily of selecting 202 and storing 203—for each pixel in an elemental subgrid or printmask as shown—a corresponding random number X. Each number X is constrained only in that it may not exceed the number L of inkdrops of any color plane allowed at any pixel, $X \leq L$.

Figure 7:
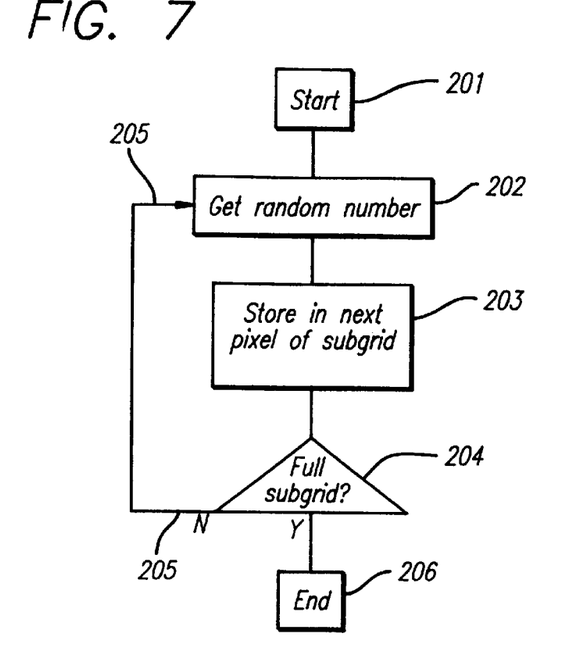
FIG. 7 is a flow chart showing operation of a printmask-generating utility or development tool, implementing certain aspects of the present invention.

The number L of allowed drops for each pixel is ordinarily a constant of the system—that is to say, is the same for all pixels. The process can make use of virtually any available random-number generator, and the only other point to be noted here is that after startup 201 the already-stated pair of steps, selection 202 and storing 203, iterates 204N, 205 until the subgrid or mask is full 204Y, 206.

The subgrid may be filled going down one column and then the next, etc., or by going across one row and then the next, etc., or indeed in any other sequence, whether arbitrary, random or otherwise—provided only that it is not deliberately manipulated during the process to introduce unwanted patterns. Subject to that one condition, because of the way these numbers will later be used the order of filling the subgrid does not matter at all.

During this preliminary generation stage the program is simply generating a numerical array, but naturally the array takes on solid physical meaning in the later usage stage—as the numerical pattern is applied directly to control electromechanical operation of the printer.

Figure 9:
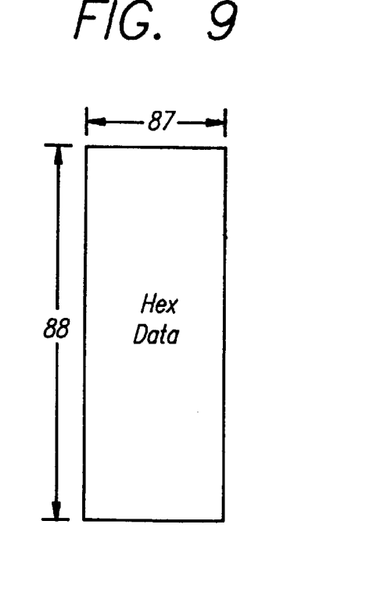
FIG. 9 is a diagram showing the elemental dimensions of a generic printmask.
Figure 12:
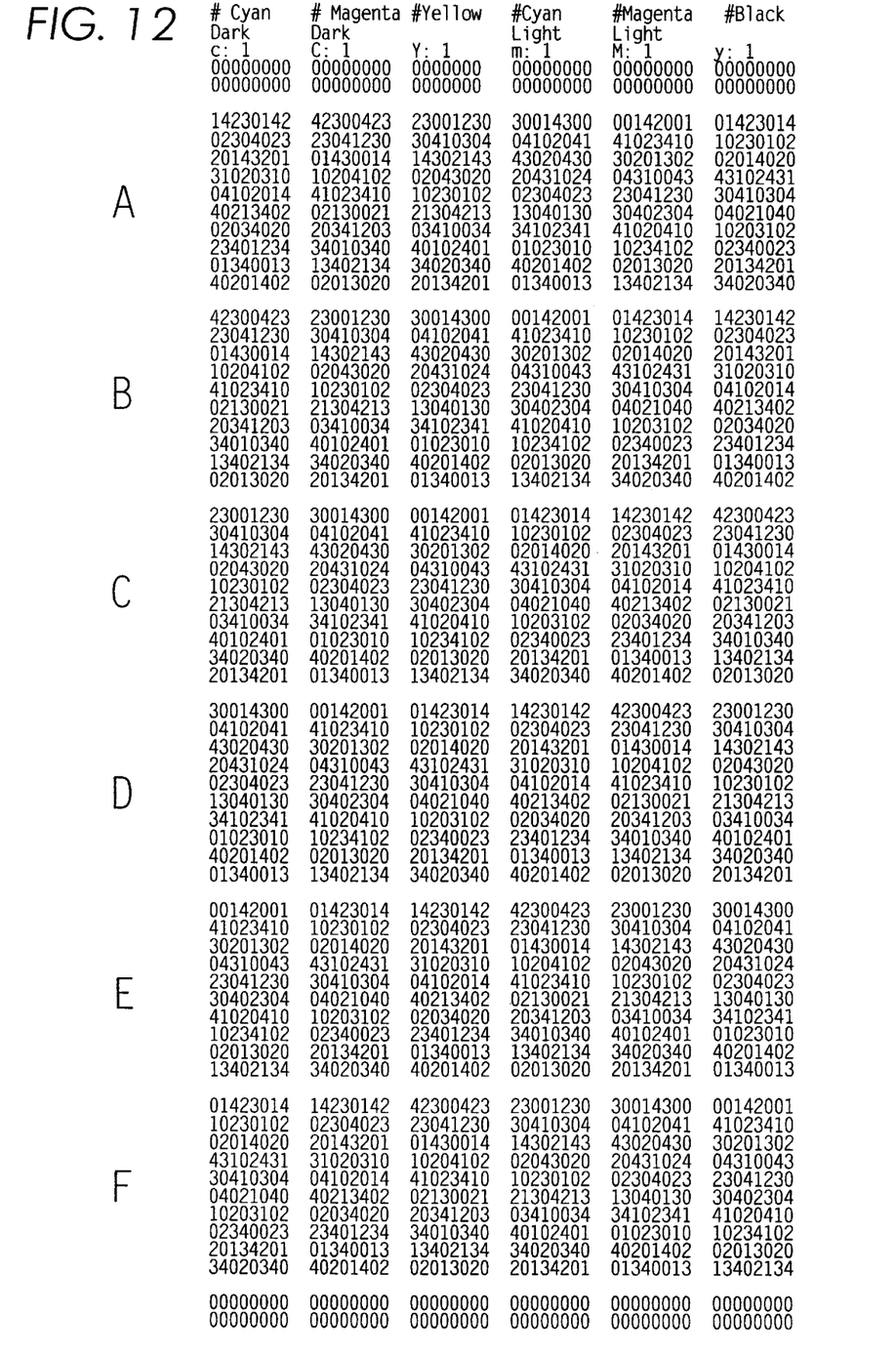
FIG. 12 is a like an example of a printmask having eight by sixty-four pixels.

The algorithmic procedure described has been used to make masks as part of preferred embodiments of the present invention, and some smaller masks too as will be seen. It is very generally characteristic of the most successful masks that they are much larger than printmasks employed heretofore. Some masks used in the preferred embodiment of the invention, as illustrated in FIGS. 9 and 12, are eight pixels wide and sixty-four pixels tall—that is, the width 87 is eight pixels and the height 88 is sixty pixels. Even larger masks have been successfully generated and tested, with excellent results.

(c) Designer participation to perfect the masking for each operating-parameter set—The objective of these mask-generation exercises is to elaborate randomized masking as a means for minimizing patterning artifacts and excess inking. The proof of this pudding thus cannot be obtained from the degree of randomization actually imparted to given masks, for the artifacts and overinking problems involved are complex products of interactions between ink and media.

These interactions at the present writing are, with some exceptions, inordinately unpredictable. The physics of microcoalescence, the chemistry of inks and paper sizing, the biochemistry of some fiber-based print media and the electrostatics of others that are synthetic, all intertwine to produce a morass of variability in observable behaviors— which often seems to go beyond the merely bewildering to the truly temperamental.

Accordingly the present invention relies heavily upon human observation, and human esthetic evaluation, to select actually useful solutions from those generated. The selection is based on actual trial of the printmasks, as applied in printing of both saturated and unsaturated images.

Extensive trial and error is involved in finding the best. Furthermore, some masks are better for some combinations of medium and quality/speed requirements, other masks for other combinations.

When a candidate mask thus constructed is found to produce a printout that is not esthetically acceptable, or better than others that have been found, the human tester discards the entire candidate mask and takes up another for testing. Such complete failures may seem catastrophic but actually are very inexpensive in machine time and reasonably cost-effective in terms of designer time.

As a practical matter the masks generated by this procedure may be denominated "randomized" or "pseudorandom": they are developed through use of random numbers, but then subjected to esthetically based exclusions which in many cases may be quite rigorous—although the human tester may not know what these exclusions are in numerical terms. The finished array cannot be regarded as truly random, since a truly random array would have many coincidences that are in effect forbidden in this environment.

(d) Indicator for print control, pixel by pixel—We have next to begin to describe how the randomly selected numbers are used. The invention employs a printmask notational system in which an indicator is used to specify, independently for each color plane and at each pixel, whether the system will print or not—and, if so how, many inkdrops to print.

It is of course common for binary printing systems to use an indicator which simply indicates for each pixel whether that pixel will be printed or not, or in some cases indicates what color or colors will be printed. Thus earlier systems may use either simply a dot, or a "1", to indicate printing versus no printing; or may use a letter (or corresponding numeral) such as "C", "M", etc. to indicate what subtractive primary will be printed.

Alternatively earlier systems may use the initial letter of a subtractive secondary such as "R", "G" etc. to represent printing of two primary dots. Analogous notations are used for defining printmasks in multilevel printers heretofore.

(e) Discriminator number as an indicator—Preferred embodiments of the present invention diverge from such conventional notations by using, for each color plane and at each pixel, a number that indicates whether printing will occur. This indication is made in such a way that the system will print, overall as among its several passes, the correct quantity of ink at each pixel.

This number will be called a "discriminator number" X, and it is thus a special case of an indicator. (As will later become clear to those skilled in the art, some aspects of the present invention as defined by the appended claims encompass use of indicators that are not discriminator numbers.) The discriminator numbers are defined and used as follows.

For each pixel, the discriminator number for each color plane is no larger than the total number L of inkdrops which are permitted in that particular color plane. For instance, in preferred embodiments of our invention the largest number L of drops permitted in any color plane is four; thus a discriminator number X may take any of the five values between zero and four inclusive, $X \leq L$.

Now, in use, to decide whether a particular color plane should print at a particular pixel the system compares the discriminator number with the number Y of inkdrops actually desired for the particular image. The latter number Y is defined by the signal, for the pixel under consideration, from the error-diffusion stage 28 discussed earlier, and as should now be clear $Y \leq L$.

No condition has been stated, however, as to relative sizes of X and Y. This depends upon the desired inking for the desired pixel and color plane, and so varies with the particular desired image to be printed.

If the discriminator number X encountered in the printmask, for the combination of pertinent pixel and color plane, does not exceed the number Y of inkdrops desired, then the system will print the corresponding $C_1C_2M_1M_2$colorant. If not, then it will not print that colorant at that pixel.

Saying the same thing the other way around, the system prints if and only if the number Y of desired drops is greater than or equal to the discriminator number X, i. e. if $Y \geq X$. The discriminator X in fact discriminates between tones that are deep (or "dark") enough to be printed, in the particular color plane involved, and tones that are not.

Each of the values above zero is respectively allowed once and only once at each pixel, for the several passes which the printhead will make over that pixel. Thus, continuing the same example of four allowed inkdrops in each plane, the discriminator number "1" is allowed once, the number "2" is allowed once, and so on through the number "5"—which also is allowed once.

If the number of passes exceeds the number of allowed inkdrops, all the remaining passes are assigned discriminator number "0". The foregoing designation and use of the discriminators is thus subject to the condition that the number zero used in the mask means, "Do nothing." In this way the inking is prevented from exceeding the permissible quantity.

(f) Sequence system for specifying masks—A printmode, or full set of printmasks for a given set of operating parameters, is constructed as a number N of two-dimensional arrays of integers—in which this quantity N equals the number of passes. This array has width 87, which we shall call "x", and height 88 which we denominate "y". The two spatial dimensions of each array have different meaning:

The height y of the array, if equal to the cartridge or full-swath height, is used one-to-one corresponding to all the nozzles, respectively. If the two heights are unequal, then the shorter one is repeated as the printing continues down the page—i. e., either the numbers are reused if the mask array is shorter than the nozzle array, or the previously untouched numbers are used when there are not enough nozzles to use all the numbers.

The width x is used repeatedly across the page for each nozzle—e. g., the first number in a nine-pixel-wide mask will be used for computation every ninth pixel across. The larger the mask, the more prevalent will be the randomness and the less prevalent the induced patterning. The smaller the mask, the more likely that the width x and height y will be apparent in periodicity of one form or another.

One set of arrays is constructed for each ink chamber or "pen"—taking that word to mean the nozzles devoted to printing any single colorant, for example, any one of the six colorants used in the preferred embodiment.

Figure 8:
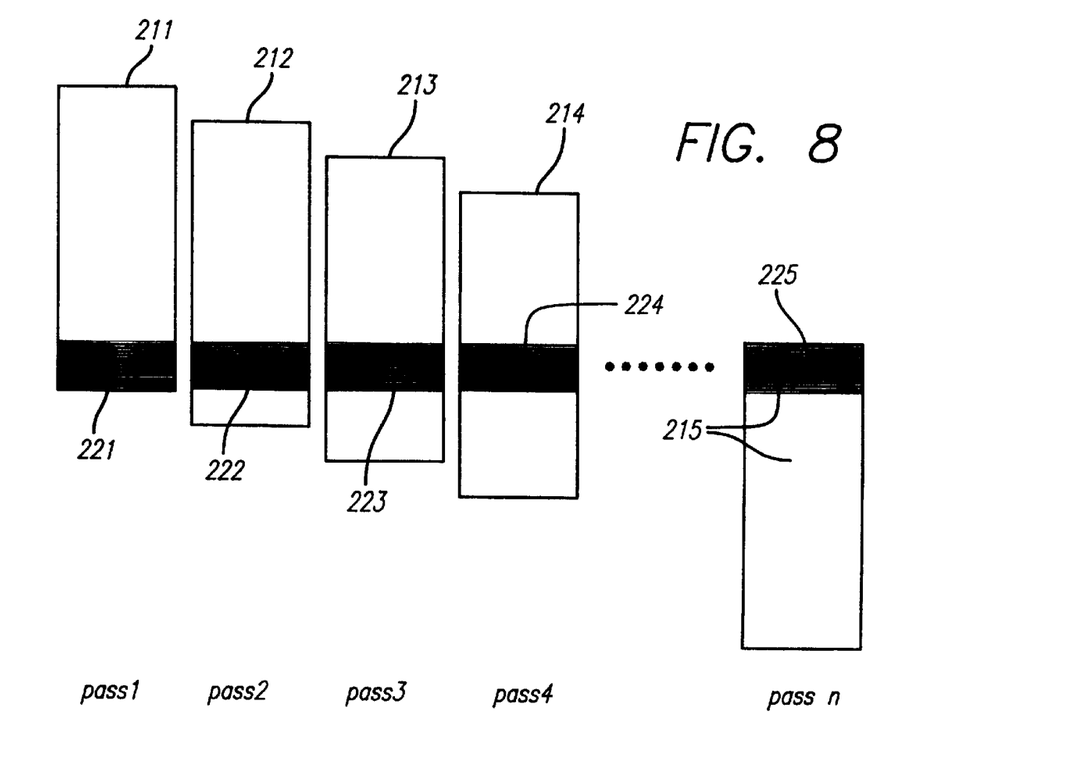
FIG. 8 is a diagram schematically showing relationships between swaths printed in a staggered printmode.

Each set of arrays is constructed in such a way that over the N passes—taking into account the printing-medium advance after per pass (i. e., for a unidirectional printing system, after each pass) and the cartridge or full-swath height—a one-hundred-percent coverage rule will not be violated. Each array in the set can be represented by a respective rectangle 211–215, each preferably but not at all necessarily equal to the height of the nozzle array for the particular printhead under consideration. The respective shaded areas 221—225 in each of the rectangles 211—215 corresponds to a single, common spatial location on the printing medium during all of the N passes.

When the number of passes N exceeds the total number of permissible inkdrops L for a particular pixel and colorant, N>L, then in some passes no drop will be printed. (Naturally the same is true when the number L of permissible drops exceeds the number Y of desired drops.) It is at this point that the discriminator numbers X come into play.

A simple example can use the assumption that three drops maximum are allowed at each location, and there are seven passes. Then the mask entries at one pixel could be $$X = 3, 0, 0, 1, 0, 2, 0.$$

In this case, if there are two drops to be printed, Y=2, then drops are put down at the fourth and sixth passes, where X=1 or 2, since Y=2>X for those two values—but no drop will be ejected at the first pass, where X=3, since Y=2<X for that value.

The number Z of possibilities of different mask entries is given by the expression $Z = N!/(N-L)!$—in which the denominator eliminates the inappropriate effect of the permutations of the zeroes, since all zeroes are the same. This number Z of possibilities all guarantee one hundred percent addressing coverage (i. e., printing coverage where maximum printing is desired for the image involved), at each pixel location.

(g) Random selection by sequence for each pixel—With the foregoing assignment of numbers to possibilities assumed to be in place, the randomization of a printmask now follows directly from that assignment plus the random-number subgrids discussed in subsections (b) and (c) above. The mask entry X in the subgrid is simply a pointer to the list of Z possibilities for choice of sequence.

In other words, each random entry in the mask is used to get a respective sequence number between 1 and Z inclusive, and the corresponding mask entries of that sequence are then inserted into each of the N arrays at the appropriate location—i. e., at the pixel in which that particular sequence number Z appears in the mask.

In a sense this assignment of which Z entry to use has to be done to only one-of the arrays, since the rest of the arrays have to correspond to that first one. The random number generator should have a uniform distribution within the range of Z values, i. e. the mask entries in the arrays should be statistically uncorrelated, so that we can refer to the masks as white-noise masks.

Figure 10:
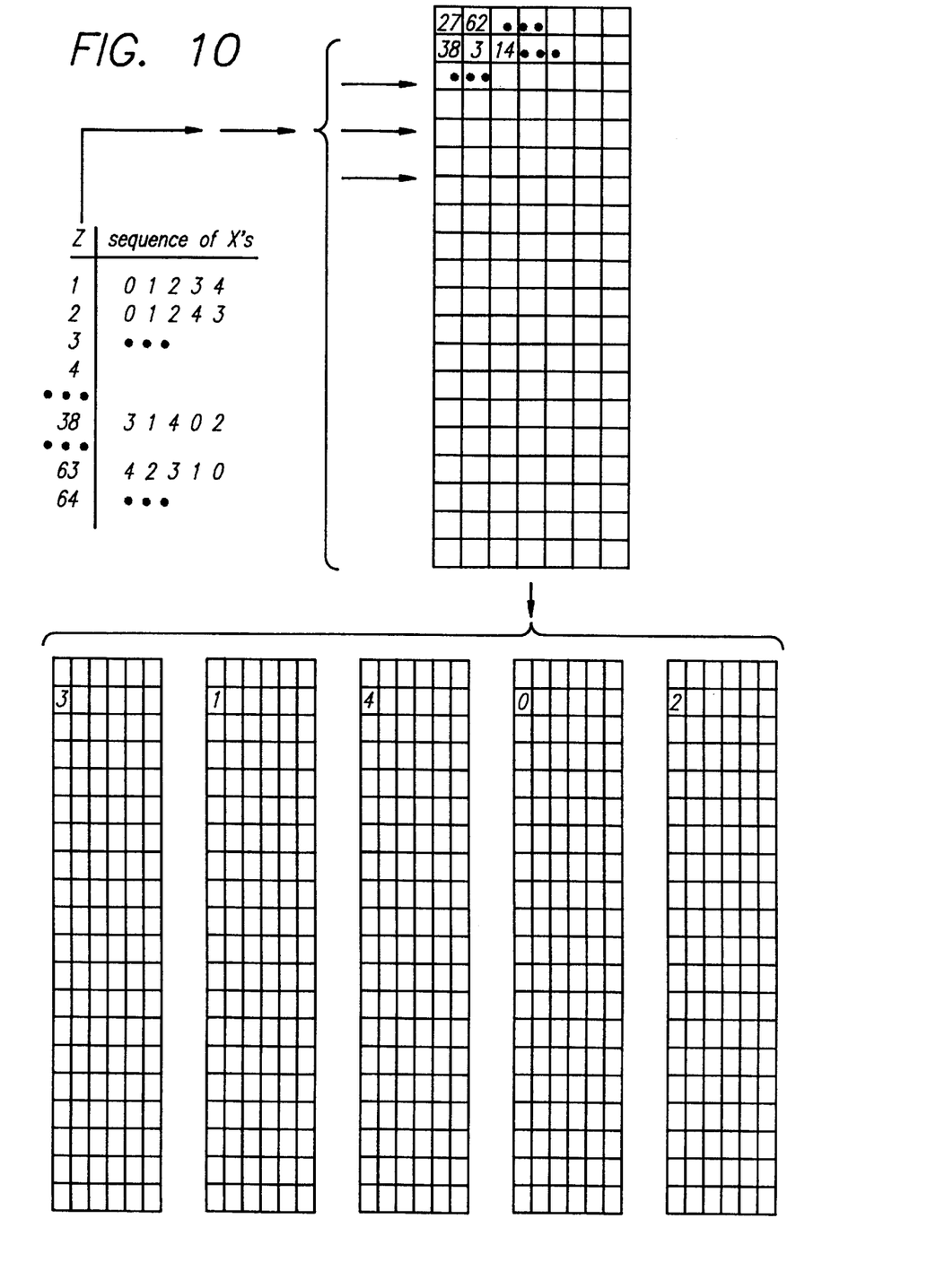
FIG. 10 is a diagram schematically showing a notation or convention for representing an exemplary set of printmasks, and more specifically showing interrelations between sequence numbers, printing indicators (e. g. discriminator numbers), a master printmask (with sequence numbers as entries), and individual-pass printmasks (with discriminator numbers as entries)

This technique of calling up whole sequences by reference to overall randomized sequence "pointers" may be illustrated by the numbered list of sixty-four sequences of discriminator numbers X in the left side of FIG. 10. The line numbers in the far-left column are the "sequence numbers" Z.

As seen at line 38—in other words, for sequence number Z=38—the sequence of discriminator numbers is "3, 1, 4, 0, 2". Next at upper right is an exemplary fragment of a master printmask, reading for one row of pixels first "27 62 . . . " and then for the following row of pixels "38 3 14 . . . ". These entries in the master printmask are sequence numbers; in other words, each of these numbers is to be taken as a number, i. e. a call to the sequence list at left.

Next we focus on the pixel in the second row and first column of the master mask. This pixel holds series (Z)

number "38". Now in the individual-pass printmasks at lower right, in each pixel where the series number "38" appears in the master mask, the successive individual-pass masks hold respective ones of the discriminator (X) numbers that make up sequence 38. They are (reading from sequence 38 while also following along in the corresponding pixel of each individual-pass mask, namely at second row, first column ):

a "3" in the pass-1 mask,
a "1" in the pass-2 mask,
a "4" in the pass-3 mask,
a "0" in the pass-4 mask, and
a "2" in the pass-5 mask.

Thus FIG. 10 shows relationships between sequence numbers Z, discriminator numbers X, master printmasks (whose entries are sequence numbers) and individual-pass printmasks (whose entries are discriminator numbers).

Figure 11:
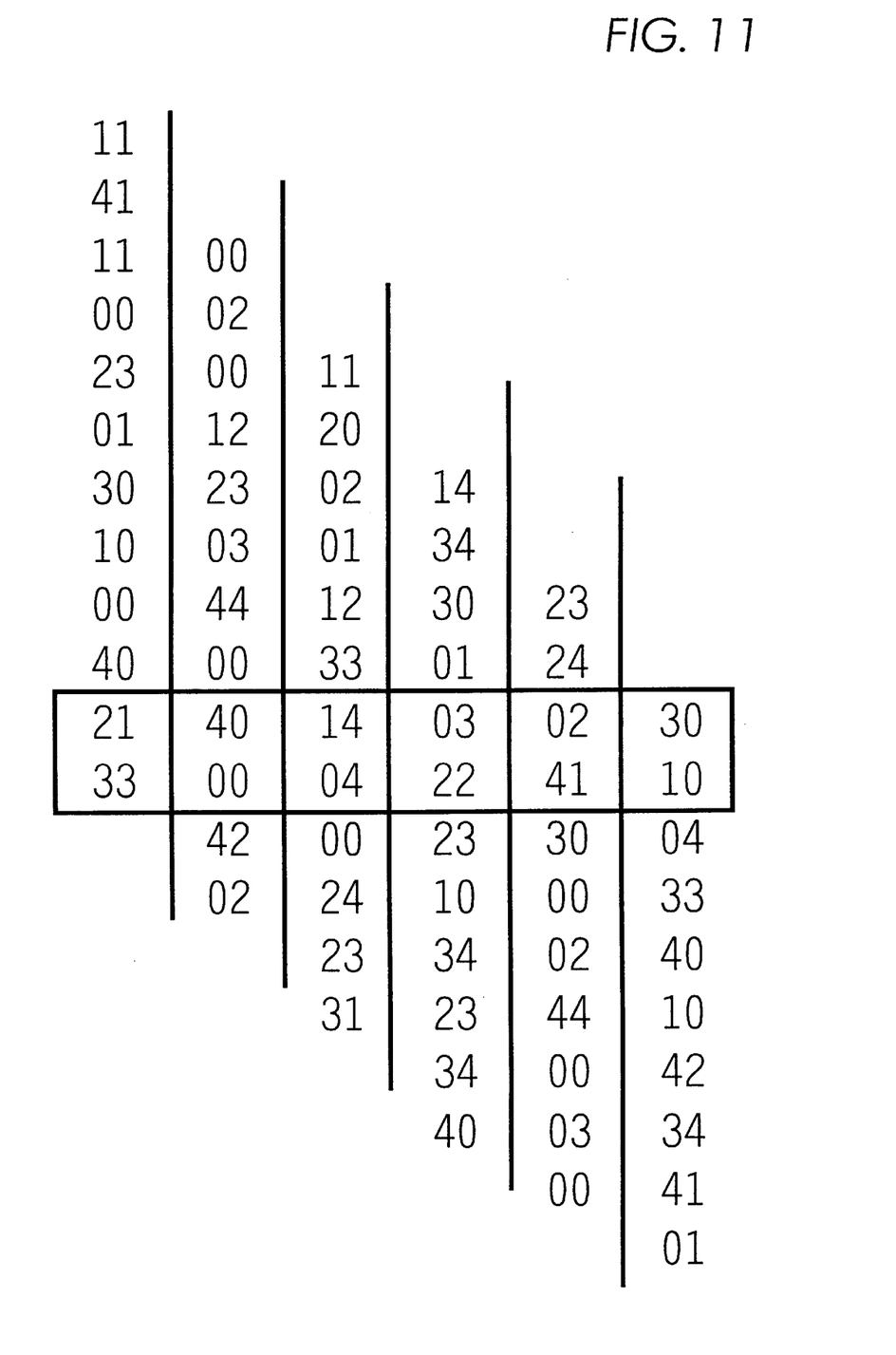
FIG. 11 is a table showing decision numbers for printing of each pixel in, primarily for tutorial purposes, a two-by-twelve-pixel printmask—for use in a six-pass printmode, with a maximum of four drops per color plane i. e., per separate colorant)

FIG. 11 is another rudimentary example, individual-pass masks for a six-pass master mask (not shown) with two columns and twelve rows—assuming four drops maximum (N=6, x=2, y=12 and L=4). It is also assumed that the printing medium advances two pixels between passes.

Successive column pairs in this diagram are accordingly stepped downward to show how a stationary area of the printing medium is addressed by different parts of the mask in successive passes. In other words the rectangle drawn across the bottom two rows of the first-pass mask and top two rows of the second-pass mask encloses identical (not adjacent) spatial locations as addressed in different passes.

As to adjacent locations (not shown), since the mask is just two pixels wide, all the illustrated discriminator numbers will repeat every two pixels across the printing medium. While usable, such a narrow mask may be unacceptably repetitive.

This example shows that the top left set of discriminator numbers inside the rectangle is, in the six successive passes, "2, 4, 1, 0, 0, 3". This is one of the sequences entered in a master mask from which these individual masks are derived.

(h) Masks according to the present invention—In the now-preferred embodiment of the invention, a separate printmask is used for each color. As will be understood, however, common masking is within the scope of the invention, as is synchronization of that masking—in the sense of addressing each pixel in the same pass for all color planes.

FIG. 12 represents an actual mask that may be used in accordance with the invention. It has width eight, height sixty-four, six passes and a maximum of four drops per chamber.

Disregarding the bottom and top two rows, which are all zeroes—unused in operation—sixty rows remain for the six passes. Hence the printing medium advances between passes by 60/6=10 pixel rows.

The six lettered blocks A through F, of ten rows each, accordingly represent subswath areas on the print medium. These ten-row blocks are stepped down in successive passes so that in the second pass block A overprints the area previously printed by block B, block B overprints the area first printed by C, etc.

Figure 13:
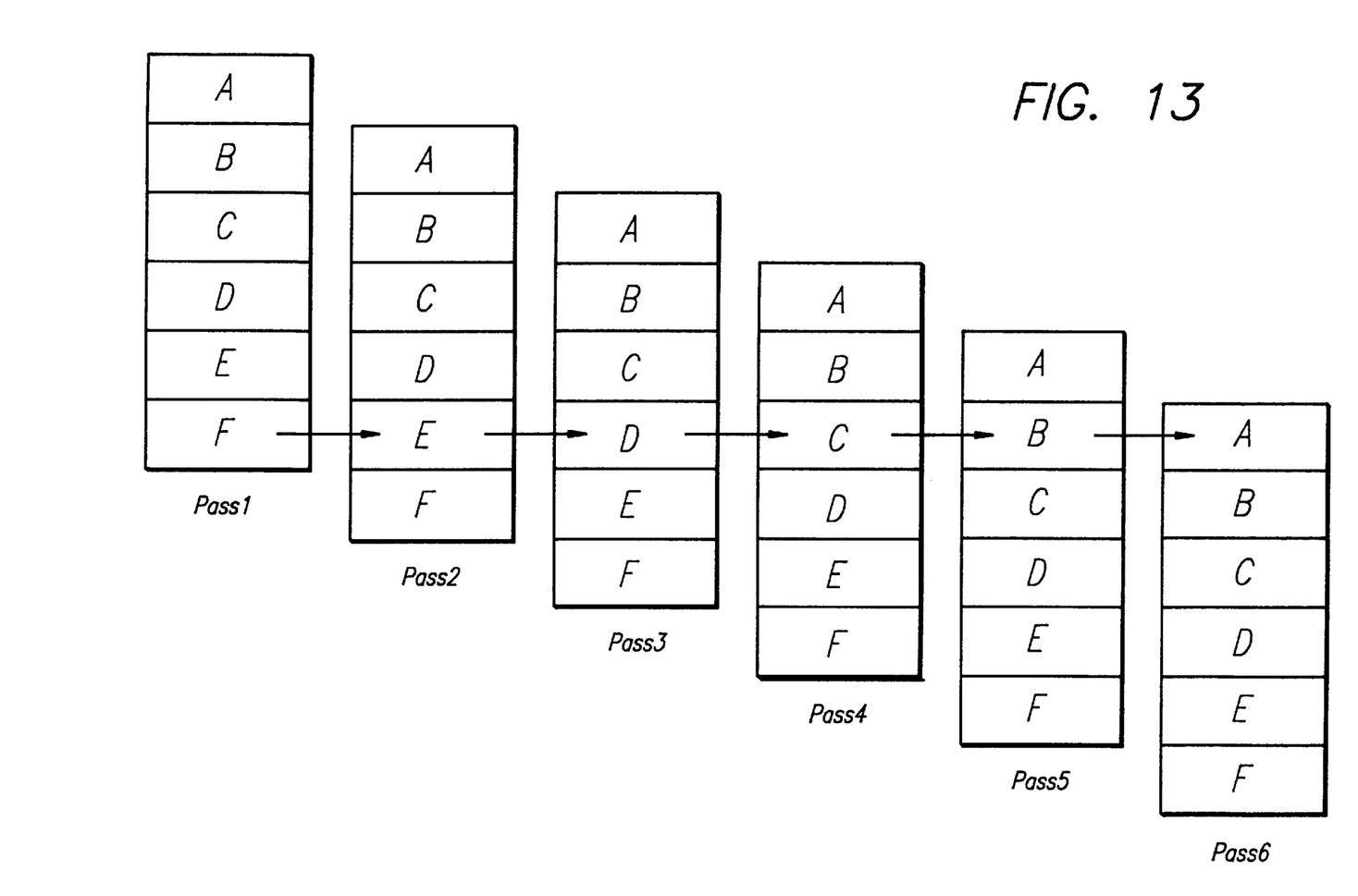
FIG. 13 is a diagram showing, for a single exemplary color planed interrelations between (1) segments of the FIG. 12 table, and (2) successive masking in every subswath (i. e., the illustration shows that FIG. 12 serves as both, though-in reverse order)

Thus in effect the mask descends along the print medium, as the medium is advanced upward, with the bottom block F reaching each subswath on the medium first (FIG. 13). Study of the drawing shows that each subswath is inked in accordance with blocks F, E, D, C, B and A in that order—which is to say, the opposite of the order in which the blocks appear in the FIG. 12 mask.

In short, there are two ways to look at data such as presented in FIG. 12: these data may be regarded as a single printmask of sixty-four (or sixty) lines, which is stepped downward along the print medium in successive passes, or as a set of six individual-pass masks (more in keeping with the earlier discussion of individual-pass masks herein)—or "elemental subgrids" as they are denominated in the "SUMMARY OF THE DISCLOSURE" section of this document—for use in inking each subswath in successive passes. Both perspectives are equally valid.

Since block F operates first on each subswath, the sequence of discriminator numbers in each pixel may be read from bottom to top. As shown, the mask includes separate data for all the six color planes in our preferred embodiment. Drawing attention to the first eight columns of the table, or in other words to the "Cyan Dark" part of the mask, it will thus be noted that for the top left pixel in each block the discriminator numbers in order of actual use on the print medium are 0 (in the bottom block F), 0, 3, 2, 4 and 1 (in the top block A).

As the numbers are all chosen randomly, it might be supposed that the blocks could be exchanged, and indeed individual rows, columns or numbers could be exchanged, at will. This sort of freedom obtains, however, only before testing. Normally, once a mask has been selected over others for its esthetic consequences, tampering with it should be avoided.

(i) Further refinement—As noted earlier, a randomized printmask according to the present invention may, as a finished product, be rather far from random. We contemplate that in the future, through use of larger masks, much greater degrees of randomization may remain in finished masks used in accordance with our invention.

3. ACTUALLY SELECTED MASKS

Figure 14:
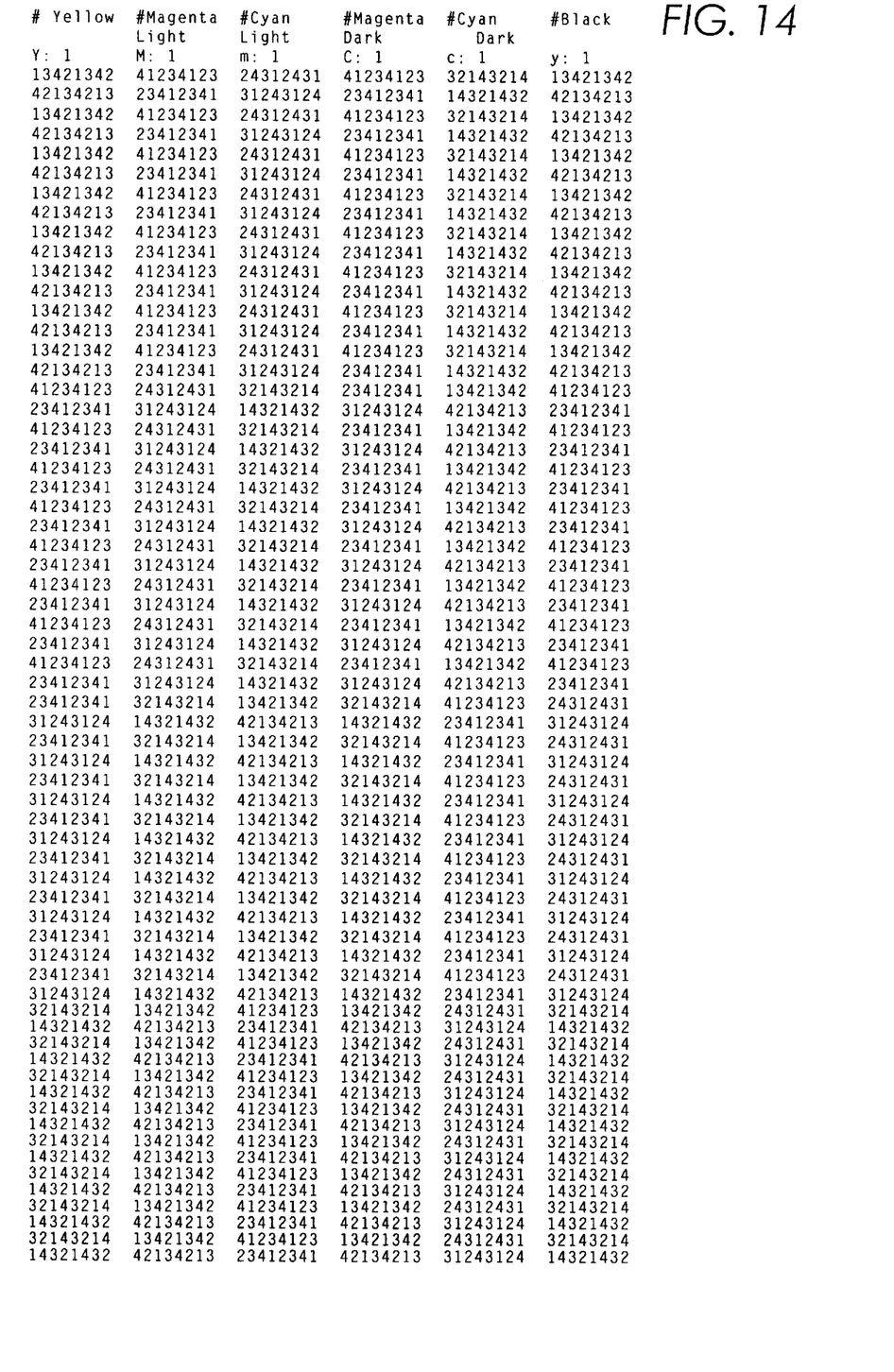
FIG. 14 is a diagram like FIG. 12 but for a less-random printmask as used in a product.

FIG. 12 represents a randomly generated mask that is fully in accordance with the invention as described hereinabove. FIG. 14 displays a mask that has been event incorporating influences of a considerably less random character.

Use of random masks continues to be considered an ideal, and we contemplate such use in future production environments. It has been noted, however, that in certain circumstances artifacts evidently arising through ink-media interactions seem to predominate over more-mechanical artifacts which are the target of randomization; therefore the focus of mask selection for current production purposes has been upon masking which controls ink-media problems.

4. OPERATION USING THE SELECTED MASKS

In operation the masks can be simply called up automatically, if different masks are needed or preferred for different operating parameters. The masks may be selected by the combination of print-quality and print-medium settings which a user of the printer/plotter enters at the control panel 12, as verified by the display 11.

Each discriminator number in a particular cell of a mask is applied directly by the system central processor, to cause the carriage drive 31, medium-advance drive 42–44, encoder sensor 37, and pen nozzles (FIG. 5) with associated firing devices all to cooperate in implementing the discriminator-number indication. That is, they cooperate in such a way that all the pixels corresponding to that particular cell will be printed during the indicated pass—if there is anything to print in those pixels respectively.

In the accompany claims, generally the term "such" is used (instead of "said" or "the") in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention and which are parts of its context, and thereby to more particularly claim the invention.

The above disclosure is intended as merely exemplary, and not to limit the scope of the invention—which is to be determined by reference to the appended claims.

What is claimed is:

1. A multilevel printer for printing a color image in which certain artifacts are substantially eliminated on a printing medium, by construction from individual inkdrops formed in a pixel grid of multiple rows and columns; said printer comprising:

means for forming inkdrops on such medium;

said forming means comprises means for inking multiple tonal levels as desired for a particular desired color image, for at least one colorant;

means for establishing a generally randomized printmask; and means for applying the generally randomized printmask to control the forming means.

2. The printer of claim 1, wherein the printmask-establishing means comprise:

means for establishing an elemental pixel subgrid having plural rows and columns, for use in determining inking patterns substantially throughout the pixel grid; and means for defining, for each pixel in the subgrid, a generally randomized indicator of whether to print or not.

3. The printer of claim 2, wherein:

the defining means comprise means for defining as said indicator a discriminator number for comparison with desired-image data.

4. The printer of claim 3, wherein:

the applying means comprise means for comparing the discriminator number with a particular desired one of said multiple tonal levels, for the particular desired color image.

5. The printer of claim 3, wherein:

said inking means comprise means for depositing or not depositing a number of drops per pixel as desired, for a particular desired color image.

6. The printer of claim 5, wherein:

the applying means comprise means for comparing the discriminator number with a particular number of drops per pixel desired, for the particular desired color image.

7. The printer of claim 3, wherein:

the forming means comprise means for inking, in at least partially overlapping multiple passes, over each subswath of such image on such printing medium; and said discriminator number at each pixel is in general different for each of said multiple passes, for a particular subswath;

discriminator numbers for said multiple passes, at each pixel, form a sequence of discriminator numbers for that pixel; and said sequence, for each pixel, is selected substantially at random from a multiplicity of such sequences.

8. The printer of claim 7, wherein:

said sequence for each pixel is preselected substantially at random from the multiplicity of sequences; and sequences for all pixels are prestored in nonvolatile memory for use in the printer.

9. The printer of claim 2, wherein:

the forming means comprise means for inking in at least partially overlapping multiple passes over each subswath of such image on such printing medium; and said indicator at each pixel is in general different for each of said multiple passes, for a particular subswath;

indicators for said multiple passes, at each pixel, form a sequence of indicators for that pixel; and said sequence, for each pixel, is selected substantially at random from a multiplicity of such sequences.

10. The printer of claim 9, wherein:

said sequence for each pixel is preselected substantially at random from the multiplicity of sequences; and sequences for all pixels are prestored in nonvolatile memory for use in the printer.

11. The printer of claim 10, wherein:

each sequence in said multiplicity of sequences is numbered; and said sequence for each pixel is selected by substantially randomly selecting a sequence number.

12. The printer of claim 1, for use in multiple printing passes and wherein:

the printmask determines which passes are permissibly used to print each pixel.

13. Apparatus for printing a color image on a printing medium, by construction from individual inkdrops formed in a pixel grid of multiple rows and columns; said apparatus comprising:

inkjet printing means for forming inkdrops on such medium in a pixel grid, during plural passes of the printing means over such medium;

for each of said plural passes, means defining an indicator of whether to print or not at each pixel;

wherein said indicators for said plural passes form a sequence of indicators for each pixel; and wherein said sequence, for each pixel, is selected generally at random from a multiplicity of such sequences; and means for applying the sequence of indicators to control the inkjet printing means.

14. The apparatus of claim 13, wherein:

said sequence for each pixel is preselected substantially at random from said multiplicity of sequences; and the preselected sequences for all pixels are pre-stored in nonvolatile memory for use in the apparatus.

15. The apparatus of claim 13, wherein:

each sequence in said multiplicity of sequences is numbered; and said sequence for each pixel is selected by substantially randomly selecting a sequence number.

16. The apparatus of claim 15, wherein the indicator-defining means comprise:

means for defining as said indicator a discriminator number for comparison with desired-image data;

for each of said plural passes the applying means compare the respective discriminator number for each pixel with desired-image data for that pixel, to determine whether to print at that pixel in that pass.

17. The apparatus of claim 16, wherein:

for each pass, for each pixel the applying means comprise means for controlling the forming means to print unless a desired amount of inking at that pixel is smaller than the discriminator number.

18. A method for creating and using a printmask for improved print quality in an inkjet printer; said method comprising the steps of:

generating a series of substantially random numbers for use in controlling whether printing will occur at a particular pixel in each of successive passes of a printhead;

for each pixel in the grid, accumulating the substantially random numbers as a sequence of indicator numbers for controlling printing in successive passes of a printhead; and for each pixel, storing said sequence in a tangible medium for later recall and use in controlling the printer.

19. The method of claim 18, wherein:

numerous sets of sequence numbers for all pixels are generated and accumulated;

each of said sets is utilized to print test images and then subjecting the test images to esthetic evaluation by humans; and any set of preselected sequences for all pixels that is not judged esthetically acceptable is discarded.

20. The method of claim 19, wherein:

the indicator number for each pixel is a discriminator for comparison with a tonal gradation, or with a quantity of inking, desired at that pixel.

21. A printer, comprising:

a print head mechanism for depositing ink droplets onto a print medium;

a controller for causing said print head to traverse above said print medium in a rectilinear path of travel and to deposit a pattern of ink droplets onto said print medium in a plurality of swaths, where each individual swath is formed in N different passes of said print head traversing along said rectilinear path of travel; and a mask generation subroutine for generating randomly N different masks for each swath to be printed to substantially eliminate artifacts in said pattern of ink droplets deposited on said print medium;

wherein said mask generation subroutine includes the steps of:

forming N number of x by y blank mask matrix arrays, selecting randomly any previously unselected one of the N number of x by y blank mask matrix arrays, selecting randomly any previously unselected mask location with the selected mask matrix array, assigning randomly a best print mode parameter to the selected mask location, repeating the last mentioned steps of selecting and assigning until all the mask locations have been selected and all mask locations in the selected mask matrix array have been assigned best print mode parameters, and repeating the steps of selecting, selecting, assigning and repeating to provide a complete set of N number of configured mask matrix arrays; and a control program responsive to said mask generation subroutine for causing said controller to apply for each swath to be printed selected individual ones of the N number of configured mask matrix arrays to control the pattern of ink droplets so that the depositing of adjacent ink droplets in each individual swath are spaced to occur in different ones of the N passes.

22. A method of mask generation, comprising the steps of:

forming N number of x by y blank mask matrix arrays;

selecting randomly any previously unselected one of the N number of x by y blank mask matrix arrays;

selecting randomly any previously unselected mask location with the selected mask matrix array;

assigning randomly a best print mode parameter to the selected mask location;

repeating the last mentioned steps of selecting and assigning until all the mask locations have been selected and all mask locations in the selected mask matrix array have been assigned best print mode parameters; and repeating the steps of selecting, selecting, assigning and repeating to provide a complete set of N number of configured mask matrix arrays.

* * * * *